United States Patent Office 3,025,273
Patented Mar. 13, 1962

3,025,273
REACTION PRODUCTS OF EPOXIDIZED DIENE POLYMERS WITH RSH COMPOUNDS AND THERMOSETTING RESINS PREPARED THEREFROM
Charles E. Wheelock, Bartlesville, Okla., assignor to Phillips Petroleum Company, a corporation of Delaware
No Drawing. Filed Jan. 20, 1958, Ser. No. 709,800
20 Claims. (Cl. 260—79)

This invention relates to reaction products of epoxidized diene polymers and thermosetting resins prepared therefrom. In copending applications, Serial No. 612,890, filed September 28, 1956, and Serial No. 626,286, filed December 5, 1956, epoxidized diene polymers have been described. These epoxy compounds are those wherein an oxygen atom bridges adjacent carbon atoms, said carbon atoms being joined by a single valence bond. Further work with these epoxidized diene polymers has disclosed that they can be reacted with sulfur-containing compounds such as hydrogen sulfide and alkyl mercaptans, the products being complex mercaptans and thiol ethers respectively. I have discovered that a new class of thermosetting resins can be prepared from these mercaptans and thiol ethers using various materials to set the sulfur-containing product.

The following are objects of my invention.

An object of my invention is to provide sulfur-containing derivatives of epoxidized diene polymers. A further object of my invention is to provide a new class of thermosetting resins. A further object of my invention is to provide a new method of preparing thermosetting resins.

Other objects and advantages of the invention will become apparent to one skilled in the art upon reading the accompanying disclosure.

The present invention relates, broadly, to the reaction product of an epoxidized diene polymer containing 0.08 to 0.8 epoxy groups per aliphatic double bond originally present in the polymer and a sulfur-containing compound such as hydrogen sulfide or an alkyl mercaptan. Furthermore, the invention is based upon the discovery that the reaction product can be used to provide a thermosetting resin when it is mixed with a halohydrocarbon containing at least two reactive halogen atoms, or a metal halide, or, when the epoxidized diene polymer is reacted with hydrogen sulfide, an organic peroxide. More specifically, the thermosetting resins are prepared by reacting epoxidized polybutadiene containing 0.08 to 0.8 epoxy groups per double bond originally present in the polymer with a sulfur containing compound selected from the group consisting of hydrogen sulfide and alkyl mercaptans, the amount of said sulfur containing compound being 0.05 to 15 mols, preferably 0.25 to 2 mols, per epoxy group present, and reacting the resulting sulfurized product with a compound selected from the group consisting of (1) chlorohydrocarbons, bromohydrocarbons, and iodohydrocarbons containing 1 to 15 carbon atoms per molecule and 2 to 5 reactive halogen atoms per molecule, reactive halogen atoms being halogen atoms attached to carbon atoms singly bonded to other carbon atoms, when present, and having not more than one additional halogen attached thereto and wherein carbon atoms adjacent a carbon atom having two reactive halogens attached thereto is bonded exclusively to atoms selected from the group consisting of carbon and hydrogen; (2) halides of the metals selected from the group consisting of titanium, aluminum, zinc and tin; and (3) when said sulfur containing compound is hydrogen sulfide, organic peroxides containing 3 to 24 carbon atoms.

When the starting material for the preparation of the resin is a homopolymer of butadiene, the epoxidized products are characterized in that the original unsaturated portion of the molecule is converted by the epoxidation reaction to units of which (1) 8 to 80 percent, preferably 13 to 50 percent, of said units are selected from the group consisting of

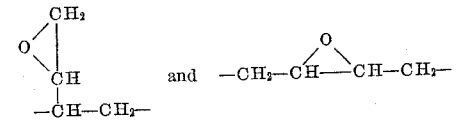

(2) up to 82 percent, preferably 50 to 77 percent, of said units are selected from the group consisting of

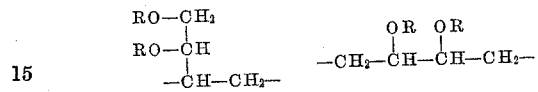

where R is selected from the group consisting of H and

$R_1$ being an alkyl, aryl, alkaryl, or aralkyl group of one to 20 carbon atoms, and (3) 10 to 35 percent of said units are selected from the group consisting of

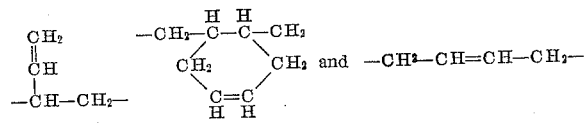

Of course, the present invention is not limited to these polymers but includes polymers, including copolymers, of dienes containing 4 to 6 carbon atoms, such as isoprene and 2,3-dimethyl-1,3-butadiene. Furthermore, other monomers can be used in preparing the copolymers such as styrene, substituted styrene, vinyl ethyl ether, acrylonitrile, methacrylonitrile, ethyl acrylate, and the like.

The liquid polymers can be prepared by any suitable method including the use of sufficient amounts of mercaptan modifiers in emulsion polymerization systems to produce liquid polymers and by mass or solution polymerization using finely divided alkali metal catalysts. A particularly preferred method is that described in Crouch 2,631,175. The products, following epoxidation, are preferably liquids having a viscosity up to 500,000 centipoises within the temperature range 0 to 100° C.

For the practice of this invention the liquid epoxidized polymers can be utilized without dilution if desired. However, it will be preferred to disperse or dissolve semi-solid polymers or to dilute viscous liquid polymers. Suitable diluents include benzene, carbon tetrachloride, chloroform and pentane. By use of these liquids the fluidity of the reaction mixture can be adjusted prior to or during reaction with the mercaptan, and control of the reaction is facilitated.

The aliphatic mercaptans represented by the formula RSH which are suitable for reaction with the epoxidized polymers include primary, secondary, and tertiary mercaptans containing 1 to 20 carbon atoms. For example, the alkyl group can be methyl, ethyl, normal butyl, tertiary butyl, isobutyl, secondary butyl, tertiary amyl, normal heptyl, normal hexyl, 2-methylamyl, normal octyl, 3-ethylhexyl, dodecyl, 2,5-dimethyldodecyl, 1,1-diamyldecyl, 1,1-dimethyloctyl, normal eicosyl, 1-propylhexyl, 1-methylundecyl, normal tetradecyl, and 1-butylhexadecyl. The reaction can be conducted using a single mercaptan or a mixture of two or more mercaptans such as can be obtained by the synthesis of mercaptans from a mixture.

The mercaptan or hydrogen sulfide can be reacted with the epoxidized polymer at temperature from 0 to 300° C., applying pressure if necessary to prevent appreciable loss of reactants or solvent. Temperatures below 100° C. produce good reaction rates. The reaction of one molecule of mercaptan or hydrogen sulfide effects the reaction

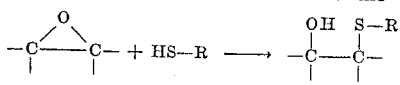

The extent of the reaction or the percentage of epoxy groups which are converted to

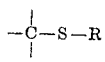

groups will depend on the amount of mercaptan or of hydrogen sulfide which is reacted. The change in the properties of the parent polymer or the properties of the product depend on the extent of the reaction. While useful products can be obtained having only a small fraction, e.g., 5 to 10 percent, of the epoxy groups reacted, it will be commonly preferred to effect reaction with 25 percent or more of the epoxy groups. Thus, 0.25 mol or more of mercaptan or of hydrogen sulfide will be commonly preferred for each mol of epoxide. It is understood, however, that to effect reaction with the epoxidized polymer, the mercaptan can be present in considerable excess during the reaction. The excess can be recovered by distillation, extraction or other convenient method.

One method by which I prepare the thermosetting resin of the present invention is to treat the polymer following reaction with the hydrogen sulfide or the alkyl mercaptan, with, preferably, 0.05 to 0.5 mol per sulfur atom in the polymer of a chlorine, bromine, or iodine substituted hydrocarbon having 2 to 5 reactive halogen atoms and 1 to 15 carbon atoms. As used herein, a "reactive halogen" is a halogen atom meeting the following requirements.

(1) A halogen substituted on an acyclic or alicyclic carbon atom having not more than one additional halogen attached thereto. Where more than 2 halogens are attached to a carbon atom, none of those attached to that specific carbon atom are included as reactive halogens.

(2) The carbon atom to which a reactive halogen is attached is not part of an unsaturated carbon to carbon linkage (—C=C— or —C≡C—) i.e., the carbon atom to which a reactive halogen is attached is singly bonded to other carbon atoms when such other carbon atoms are present.

(3) The carbon atoms adjacent a carbon atom attached to two reactive halogens do not have any halogen atoms attached thereto.

Examples of such compounds include dichloromethane; 1,2-dichloroethane; 1,3-dichloropropane; 1,2,3-trichloropropane; 1,1,4-trichloro-2-butene; 1,2,2,3-tetrachloropropane; tetra(chloromethyl)methane; 1,2,5,5,5-pentachloropentane; 3,3-dichloropentane; 6,6-dichloro-1-hexyne; 2,4-dibromohexane; 2,4-dichlorohexane; 1,1,6-trichloro-3-methylhexane; 1,6-dichloro-2-hexene; 1,2,5,6-tetrachloro-2-hexene; 3,6-di(iodomethyl)octane; 1-bromo-4,5-dichloro-8-iodooctane; 1,8-dibromo-4,5-dipropyloctane; 1,8-dichloro-4,5-dipropyloctane; 1,2,4,8-tetrachlorooctane; 1,1,4,8,8-pentachlorooctane; 1,10-dichlorodecane; 1,3-dibromo-4,5-dichlorodecane; 1-bromo-6-chloro-12-iodododecane; 1,15-dichloropentadecane; benzylidine chloride; xylylene chloride; p-(α-chloro-β-chloroethyl)benzyl chloride; α,α'-dichloro-1,4-diethylbenzene; α,α'-dichloro-2,6-diethylnaphthalene; and para-dibromocyclohexane.

The sulfur containing reaction products can also be mixed with metal halides to provide thermosetting resins, suitable halides being the fluorides, chlorides, bromides, and iodides of titanium, aluminum, zinc and tin. I prefer to use 0.05 to 1 mol of metal halide per sulfur atom in the polymer. Examples of these halides include titanium tetrachloride, titanium tetrabromide, titanium triiodide, aluminum fluoride, aluminum chloride, aluminum bromide, zinc iodide, zinc chloride, stannic chloride, stannic fluoride, stannic bromide, stannous chloride, stannous iodide and tin dibromide dichloride.

The above groups of materials can be used with the reaction product of the epoxidized diene polymer with either hydrogen sulfide or the alkyl mercaptan to provide a thermosetting resin. An additional group of materials can be used when the reaction product of the epoxidized polymer and the hydrogen sulfide is used, these being organic peroxides having 3 to 24 carbon atoms per molecule. I prefer to use 0.1 to 5 weight percent of the peroxide based on the weight of the reaction product of epoxidized polymer and hydrogen sulfide. These peroxides have the —O—O— linkage in the structure, and more generally the formula R—OO—R' where R can be an organic radical consisting of carbon, hydrogen and oxygen atoms and R' can be hydrogen or R. The R and R' radicals together with the —O—O— grouping can form a cyclic structure in which the atoms comprising said cyclic structure are carbon or oxygen. The peroxides and hydroperoxides are illustrated by the alkyl peroxides, the alkyl hydroperoxides, the aralkyl hydroperoxides, the alkyl hydroxyalkyl peroxides, the peroxacetals, the hydroxyalkyl hydroperoxides, the bis-hydroxyalkylperoxides, and the ketone peroxides. Examples of these compounds include: diethyl peroxide; n-butyl hydroperoxide; di-tert-butyl peroxide; tert-butyl hydroperoxide; 1,1-diethylpropyl hydroperoxide; methyl ethyl peroxide; di-(1,1-diethylpropyl) peroxide; acetyl benzoyl peroxide; didodecyl peroxide; glutaric peroxide; acetone peroxide; succinic peroxide; succinic hydrogen peroxide; crotonyl peroxide; α,α'-dimethylbenzyl hydroperoxide; p-tert-butyl α,α'-dimethylbenzyl hydroperoxide; 1,2,3,4-tetrahydro-1-naphthyl hydroperoxide; di-tert-butyl peroxide; triphenylmethyl hydroperoxide; methyl ethyl ketone peroxide; methyl isobutyl ketone peroxide; methyl amyl ketone peroxide; cyclohexanone peroxide; acetyl peroxide; lauroyl peroxide; benzoyl peroxide; tert-butyl peracetate; tert-butyl perbenzoate; di-tert-butyl diperphthlate; tert-butyl perphthalic acid; di(α,α'-dimethylbenzyl) peroxide; 1-hydroxycyclohexyl hydroperoxide; bis(1-hydroxycyclohexyl)peroxide; 1-hydroxy-1'-hydroxyoxycyclohexyl peroxide; bis(hydroperoxycyclohexyl)peroxide; and bis-(1-hydroxyethyl)peroxide.

In the examples of the present application an epoxidized polymer was prepared in the following manner.

Liquid polybutadiene, prepared according to the method of Crouch 2,631,175 and having a viscosity of about 1500 Saybolt Furol seconds at 100° F. and an unsaturation of 80 percent of theoretical, e.g., 0.8 double bonds per $C_4$ unit, was stripped in a batch operation by flushing for 45 minutes with nitrogen at a temperature of 190° to 200° C. and at a pressure of 10 to 20 mm. Hg absolute. This polymer was epoxidized by dissolving 432 grams of the polymer in two liters of chloroform to which was added 280 grams of a nuclear sulfonated ion exchange resin (Amberlite IR-120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. The ion exchange resin was removed by filtration. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume 1, pages 135-136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

Several batches of the polymer were prepared according to the above method and blended. Analysis of this blend showed it to contain 5.4 percent by weight of epoxy oxygen and a total oxygen content of 9.3 percent on the same basis. The polymer contained 0.27 atom of epoxy oxygen, 0.09 hydroxyl group and 0.05 ester group for each aliphatic double bond originally present in the liquid polybutadiene. The product had a viscosity of over 400,000 centipoises at room temperature as measured by a Brookfield viscosimeter.

*Example I*

The epoxidized liquid polybutadiene was reacted with amyl mercaptan by adding 66.7 grams of the epoxidized polymer to a solution of 70 grams of the mercaptan in 200 milliliters of chloroform. The mixture was refluxed at atmospheric pressure for 96 hours, the temperature being approximately 61° C. To remove excess mercaptan, the mixture was stripped at 80° C. at a pressure of about 5 mm. Hg and thereafter dissolved in 200 milliliters of chloroform and subsequently washed with dilute (1 to 5 percent) sodium hydroxide. The product was then washed with water and subsequent analysis thereof showed 5.7 percent sulfur.

This product, following heating under nitrogen for 48 hours produced a gel having a Shore A hardness of 28.

*Example II*

Five grams of the thiol ether of Example I were mixed with three grams of ethylene dichloride. The mixture was heated for three days at 100° C., an additional seven days at 68° C. and finally, 150° C. for 48 hours. The product had a Shore A hardness of 65.

*Example III*

Five grams of the thiol ether of Example I were mixed with 5.7 grams of titanium tetrachloride. The mixture set up very rapidly and the resulting resin had a Shore A hardness of 77.

*Example IV*

To show the reaction with hydrogen sulfide, 100 grams of the epoxidized liquid polybutadiene, described above, were dissolved in 300 milliliters of carbon disulfide. The mixture was cooled with ice and a total of 136.6 grams (4 mols) of hydrogen sulfide was passed into the solution. To maintain the product in solution chloroform and acetone were added. After ten days at room temperature the solvent was stripped from the solution at 60° C. using a vacuum and the product, a viscous yellow oil, was recovered, said product containing 0.62 weight percent of sulfur.

To a portion of this reaction product, 0.015 part by weight of tertiary butyl hydroperoxide was added. The same amount of the tertiary butyl hydroperoxide was added to a portion of the original epoxidized liquid polybutadiene. Both mixtures were heated for 61 hours at 84° C. The mixture of the epoxidized liquid polybutadiene and the hydroperoxide was still liquid at this time but the portion treated with the hydrogen sulfide was firmly gelled. After an additional 103 hours at 112° C. both products were solid. Without the hydrogen sulfide treatment, the product was soft and weak, having a Shore D hardness of 7. The cured resin using the sulfur-containing product was hard, strong, and very adherent to glass. It had a Shore D hardness of 77.

The products of this invention can be used to replace thermosetting resins of the prior art as coating compositions, laminating agents, potting compounds and the like. When desired, fillers, dyes, or pigments can be added. Blends can be made with other resinous materials.

As many possible embodiments can be made of this invention without departing from the scope thereof, it is to be understood that all matter herein set forth is to be interpreted as illustrative and not as unduly limiting the invention.

I claim:
1. The reaction product of an epoxidized polymer of a conjugated diene having 4 to 6 carbon atoms, said polymer having been epoxidized with hydrogen peroxide and containing 0.08 to 0.8 epoxy groups per aliphatic double bond originally present in the polymer and a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer.

2. The product of claim 1 wherein said sulfur containing compound is hydrogen sulfide.

3. The product of claim 1 wherein said sulfur containing compound is an alkyl monomercaptan.

4. The reaction product of epoxidized liquid polybutadiene, said polymer having been epoxidized with hydrogen peroxide and containing 0.08 to 0.8 epoxy groups per double bond originally present in the polymer and a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer.

5. The product of claim 4 wherein said sulfur containing compound is hydrogen sulfide.

6. The product of claim 4 wherein said sulfur containing compound is amyl monomercaptan.

7. A thermosetting resin prepared by mixing the reaction product of an epoxidized polymer of a conjugated diene having 4 to 6 carbon atoms, said polymer having been epoxidized with hydrogen peroxide and containing 0.08 to 0.8 epoxy groups per aliphatic double bond originally present in the polymer and a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer, with a compound selected from the group consisting of (1) chlorohydrocarbons, bromohydrocarbons, and iodohydrocarbons containing 1 to 15 carbon atoms per molecule and 2 to 5 reactive halogen atoms per molecule, reactive halogen atoms being halogen atoms attached to carbon atoms singly bonded to other carbon atoms and having not more than one additional halogen attached thereto and wherein carbon atoms adjacent a carbon atom having two reactive halogens attached thereto is bonded exclusively to atoms selected from the group consisting of carbon and hydrogen; and (2) halides of the metals selected from the group consisting of titanium, aluminum, zinc, and tin.

8. The resin of claim 7 wherein said epoxidized polymer is epoxidized liquid polybutadiene.

9. The method of preparing a thermosetting resin comprising reacting an epoxidized polymer of a conjugated diene having 4 to 6 carbon atoms, said polymer having been epoxidized with hydrogen peroxide and containing 0.08 to 0.8 epoxy group per aliphatic double bond originally present in the polymer with a sulfur containing compound in an amount to provide at least 0.05 mol thereof per epoxy group in said polymer, said sulfur containing compound being selected from the group consisting of hydrogen sulfide and alkyl monomercaptans, the amount of said sulfur containing compound being 0.05 to 15 mols per epoxy group present, the reaction taking place between said sulfur-containing compound and epoxy groups in the polymer and reacting the resulting sulfurized product with a compound selected from the group consisting of (1) chlorohydrocarbons, bromohydrocarbons, and iodohydrocarbons containing 1 to 15 carbon atoms per molecule and 2 to 5 reactive halogen atoms per molecule, reactive halogen atoms being halogen atoms attached to carbon atoms singly bonded to other carbon atoms and having not more than one additional halogen attached thereto and wherein carbon atoms adjacent a carbon atom having two reactive halogens attached thereto is bonded exclusively to atoms selected from the group consisting of carbon and hydrogen; and (2) halides of the metals selected from the group consisting of titanium, aluminum, zinc, and tin.

10. The method of preparing a thermosetting resin comprising reacting epoxidized polybutadiene, said polymer having been epoxidized with hydrogen peroxide and containing 0.08 to 0.8 epoxy groups per double bond originally present in the polymer with a sulfur containing compound in an amount to provide at least 0.05 mol thereof per epoxy group in said polymer, said sulfur containing compound being selected from the group consisting of hydrogen sulfide and alkyl monomercaptans, the amount of said sulfur containing compound being 0.05 to 15 mols per epoxy group present, the reaction taking place between said sulfur-containing compound and epoxy groups in the polymer and reacting the resulting sulfurized product with a compound selected from the group consisting of (1) chlorohydrocarbons, bromohydrocarbons, and iodohydrocarbons containing 1 to 15 carbon atoms per molecule and 2 to 5 reactive halogen atoms per molecule, reactive halogen atoms being halogen atoms attached to carbon atoms singly bonded to other carbon atoms and having not more than one additional halogen attached thereto and wherein carbon atoms adjacent a carbon atom having two reactive halogens attached thereto is bonded exclusively to atoms selected from the group consisting of carbon and hydrogen; and (2) halides of the metals selected from the group consisting of titanium, aluminum, zinc, and tin.

11. The method of preparing a thermosetting resin comprising contacting epoxidized polybutadiene, said polymer having been epoxidized with hydrogen peroxide and containing 0.08 to 0.8 epoxy groups per double bond originally present in the polymer with amyl mercaptan, the amount of said amyl mercaptan being in the range of 0.25 to 2 mols per epoxy group present in said epoxidized polybutadiene, adding ethylene dichloride and heating to cross-link the product.

12. The method of preparing a thermosetting resin comprising contacting epoxidized polybutadiene, said polymer having been epoxidized with hydrogen peroxide and containing 0.08 to 0.8 epoxy groups per double bond originally present in the polymer with amyl mercaptan, the amount of said amyl mercaptan being in the range of 0.25 to 2 mols per epoxy group present in said epoxidized polybutadiene, and adding titanium tetrachloride to set the product.

13. The method of preparing a thermosetting resin comprising passing hydrogen sulfide into epoxidized liquid polybutadiene, said polymer having been epoxidized with hydrogen peroxide and containing 0.08 to 0.8 epoxy groups per double bond originally present in the polymer, the amount of hydrogen sulfide being in the range of 0.25 to 15 mols thereof per mol of epoxy oxygen in the polymer, adding tertiary butyl hydroperoxide and heating the mixture to thermoset the same.

14. A reaction product of (A) epoxidized liquid polybutadiene, said polymer having been epoxidized with hydrogen peroxide and characterized in that the original unsaturated portion of the molecule is converted by the epoxidation reaction units of which (1) 8 to 80 percent of said units are selected from the group consisting of

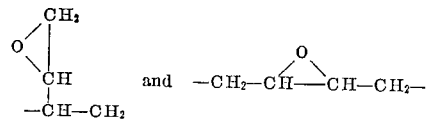

and —CH$_2$—CH—CH—CH$_2$—

(2) up to 82 percent of said units are selected from the group consisting of

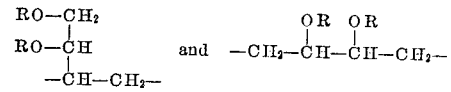

and —CH$_2$—CH—CH—CH$_2$— where R is selected from the group consisting of H and

R$_1$ being an alkyl, aryl, alkaryl, or aralkyl group of one to 20 carbon atoms, and (3) 10 to 35 percent of said units are selected from the group consisting of

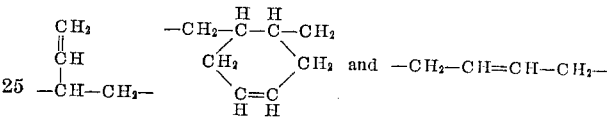

and —CH$_2$—CH=CH—CH$_2$— and (B) 0.05 to 15 mols per epoxy group of a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer.

15. A reaction product of (A) epoxidized liquid polybutadiene, said polymer having been epoxidized with hydrogen peroxide and characterized in that the original unsaturated portion of the molecule is converted by the epoxidation reaction to units of which (1) 13 to 50 percent of said units are selected from the group consisting of

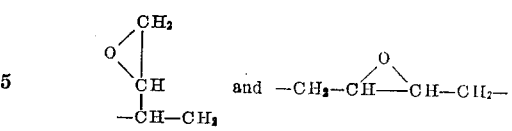

and —CH$_2$—CH—CH—CH$_2$—

(2) 50 to 77 percent of said units are selected from the group consisting of

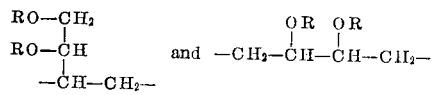

and —CH$_2$—CH—CH—CH$_2$— where R is selected from the group consisting of H and

R$_1$ being an alkyl, aryl, alkaryl, or aralkyl group of one to 20 carbon atoms, and (3) 10 to 35 percent of said units are selected from the group consisting of

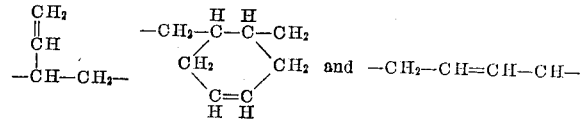

and —CH$_2$—CH=CH—CH— and (B) 0.25 to 2 mols per epoxy group of a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer.

16. The product of claim 15 wherein said sulfur containing compound is hydrogen sulfide.

17. The product of claim 15 wherein said sulfur containing compound is an alkyl monomercaptan.

18. A reaction product of (A) epoxidized liquid polybutadiene, said polymer having been epoxidized with hydrogen peroxide and characterized in that the original unsaturated portion of the molecule is converted by the epoxidation reaction to units of which (1) 8 to 80 percent of said units are selected from the group consisting of

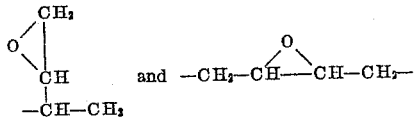

(2) up to 82 percent of said units are selected from the group consisting of

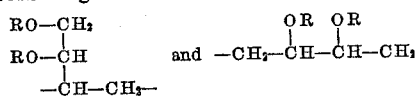

where R is selected from the group consisting of H and

$R_1$ being an alkyl, aryl, alkaryl, or aralkyl group of one to 20 carbon atoms, and (3) 10 to 35 percent of said units are selected from the group consisting of

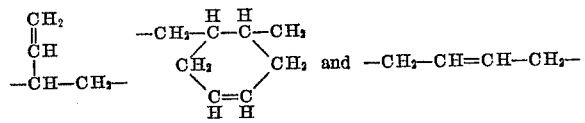

(B) 0.05 to 15 mols per epoxy group of a sulfur containing compound in an amount to provide at least 0.05 mol thereof per epoxy group in said polymer, said sulfur containing compound being selected from the group consisting of hydrogen sulfide and alkyl monomercaptans, said reaction product resulting from the reaction between the sulfur-containing compound and epoxy groups in the polymer, and (c) a compound selected from the group consisting of (x) 0.05 to 0.5 mols per sulfur atom in the product of (A) and (B) of chlorohydrocarbons, bromohydrocarbons, and iodohydrocarbons containing 1 to 15 carbon atoms per molecule and 2 to 5 reactive halogen atoms per molecule, reactive halogen atoms being halogen atoms attached to carbon atoms singly bonded to other carbon atoms and having not more than one additional halogen attached thereto and wherein carbon atoms adjacent a carbon atom having two reactive halogens attached thereto is bonded exclusively to atoms selected from the group consisting of carbon and hydrogen; and (y) 0.05 to 1 mol per sulfur atom in the product of (A) and (B) of halides of the metals selected from the group consisting of titanium, aluminum, zinc and tin.

19. A thermosetting resin prepared by mixing an organic peroxide containing 3 to 24 carbon atoms with the reaction product of an epoxidized polymer of a conjugated diene having 4 to 6 carbon atoms, said polymer having been epoxidized with hydrogen peroxide and containing 0.08 to 0.8 epoxy groups per aliphatic double bond originally present in the polymer and hydrogen sulfide in an amount to provide 0.05 to 15 mols thereof per epoxy group in said polymer, said reaction product resulting from the reaction between the hydrogen sulfide and epoxy groups in the polymer.

20. The resin of claim 19 wherein the original unsaturated portion of the molecule is converted by the epoxidation reaction to units of which (1) 8 to 80 percent of said units are selected from the group consisting of

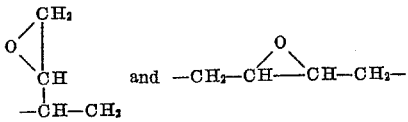

(2) up to 82 percent of said units are selected from the group consisting of

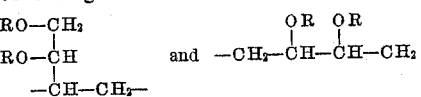

where R is selected from the group consisting of H and

$R_1$ being an alkyl, aryl, alkaryl, or aralkyl group of one to 20 carbon atoms, and (3) 10 to 35 percent of said units are selected from the group consisting of

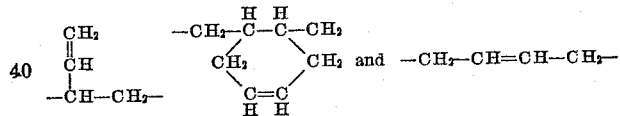

References Cited in the file of this patent
UNITED STATES PATENTS

| | | |
|---|---|---|
| 2,633,458 | Shokal | Mar. 31, 1953 |
| 2,806,884 | Tapp | Sept. 17, 1957 |
| 2,826,556 | Greenspan et al. | Mar. 11, 1958 |
| 2,829,135 | Greenspan et al. | Apr. 1, 1958 |
| 2,831,830 | Schroeder | Apr. 22, 1958 |
| 2,831,896 | Holly | Apr. 22, 1958 |
| 2,932,627 | Greenspan et al. | Apr. 12, 1960 |

UNITED STATES PATENT OFFICE
CERTIFICATE OF CORRECTION

Patent No. 3,025,273            March 13, 1962

Charles E. Wheelock

It is hereby certified that error appears in the above numbered patent requiring correction and that the said Letters Patent should read as corrected below.

Column 7, line 75, after "reaction" insert -- to --; column 8, lines 61 to 65, the extreme right-hand formula should appear as shown below instead of as in the patent:

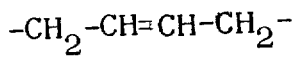

Signed and sealed this 21st day of August 1962.

(SEAL)
Attest:

ESTON G. JOHNSON

Attesting Officer

DAVID L. LADD

Commissioner of Patents